(12) United States Patent
Raghavan et al.

(10) Patent No.: US 12,520,166 B2
(45) Date of Patent: Jan. 6, 2026

(54) HYBRID BEAMFORMING SELECTION FOR HIGHER-ORDER MIMO

(71) Applicant: QUALCOMM Incorporated, San Diego, CA (US)

(72) Inventors: Vasanthan Raghavan, West Windsor Township, NJ (US); Arumugam Chendamarai Kannan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 18/150,338

(22) Filed: Jan. 5, 2023

(65) Prior Publication Data
US 2024/0236704 A1 Jul. 11, 2024

(51) Int. Cl.
H04W 16/28 (2009.01)
H04W 24/10 (2009.01)

(52) U.S. Cl.
CPC ........... H04W 16/28 (2013.01); H04W 24/10 (2013.01)

(58) Field of Classification Search
CPC .............................. H04W 16/28; H04W 24/10
See application file for complete search history.

(56) References Cited

U.S. PATENT DOCUMENTS

| | | | | |
|---|---|---|---|---|
| 2007/0099578 A1* | 5/2007 | Adeney | ................ | H04B 7/0408 455/25 |
| 2017/0331541 A1* | 11/2017 | Kang | ................... | H04B 7/0469 |
| 2017/0353221 A1* | 12/2017 | Kang | ................... | H04L 5/0048 |
| 2018/0219598 A1* | 8/2018 | Kim | ..................... | H04B 7/0478 |
| 2019/0013854 A1* | 1/2019 | Kim | ..................... | H04B 7/066 |
| 2020/0314934 A1* | 10/2020 | Raghavan | ............ | H04W 76/15 |
| 2020/0382194 A1* | 12/2020 | Park | ...................... | H04W 72/21 |
| 2021/0007117 A1* | 1/2021 | Park | ...................... | H04B 7/024 |
| 2021/0058128 A1* | 2/2021 | Raghavan | ............ | H04B 7/0696 |
| 2021/0083914 A1* | 3/2021 | Cao | ....................... | H04L 5/0053 |
| 2021/0127382 A1* | 4/2021 | Garcia | ................ | H04B 7/0617 |
| 2021/0143887 A1* | 5/2021 | Oteri | ..................... | H04B 7/088 |
| 2021/0297120 A1* | 9/2021 | Rusek | .................. | H04B 7/0452 |
| 2021/0351838 A1* | 11/2021 | Zhang | .................. | H04L 5/0023 |
| 2022/0069884 A1 | 3/2022 | Zhang et al. | | |

(Continued)

OTHER PUBLICATIONS

International Search Report and Written Opinion—PCT/US2023/081856—ISA/EPO—Mar. 26, 2024.

Primary Examiner — Fahmida S Chowdhury
(74) Attorney, Agent, or Firm — Harrity & Harrity LLP/Qualcomm Incorporated

(57) ABSTRACT

Various aspects of the present disclosure generally relate to wireless communication. In some aspects, a user equipment (UE) may transmit a measurement report indicating a plurality of candidate beam pairs for multiple-input multiple-output (MIMO) communication with a network node, wherein the plurality of candidate beam pairs includes a first beam pair and a second beam pair, wherein each beam of the plurality of candidate beam pairs has a spatial characteristic and a polarization characteristic. The UE may receive a MIMO configuration for the first beam pair and the second beam pair, wherein a beam of the second beam pair is outside a beam avoidance region, wherein the beam avoidance region is defined based at least in part on the spatial characteristic of a beam of the first beam pair. Numerous other aspects are described.

29 Claims, 13 Drawing Sheets

(56) References Cited

U.S. PATENT DOCUMENTS

| | | | | |
|---|---|---|---|---|
| 2022/0272680 A1* | 8/2022 | Landis | .................. | H04W 72/02 |
| 2022/0407583 A1* | 12/2022 | Raghavan | ............. | H04W 24/10 |
| 2023/0268980 A1* | 8/2023 | Hemadeh | .............. | H04L 1/0625 |
| | | | | 370/330 |
| 2024/0236704 A1* | 7/2024 | Raghavan | .......... | H04B 7/06952 |
| 2024/0284200 A1* | 8/2024 | Shao | ..................... | H04W 24/10 |

* cited by examiner

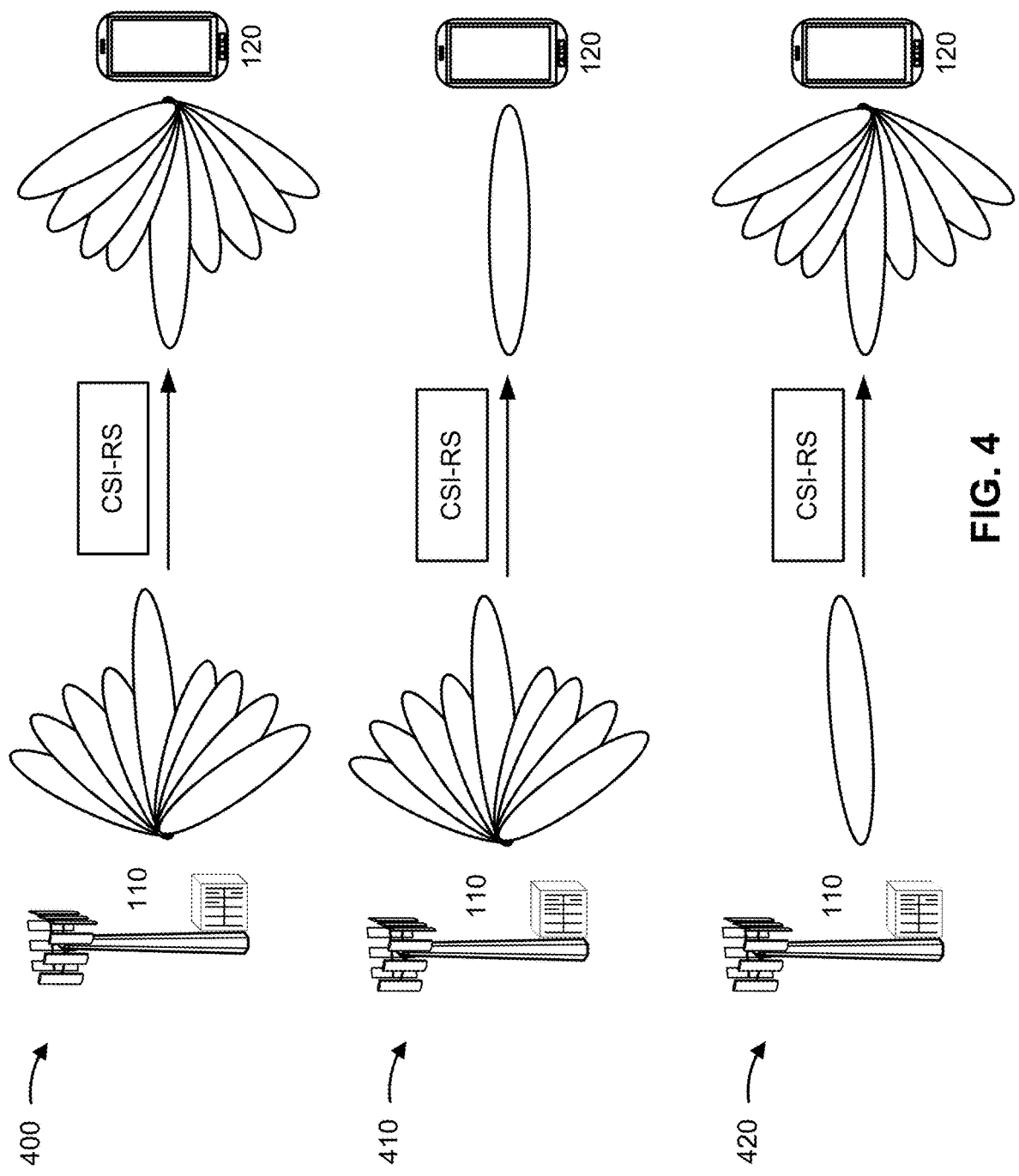

HYBRID BEAMFORMING SELECTION FOR HIGHER-ORDER MIMO

FIELD OF THE DISCLOSURE

Aspects of the present disclosure generally relate to wireless communication and to techniques and apparatuses for beam selection with hybrid beamforming over higher-order multiple-input multiple-output (MIMO) communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to transmit a measurement report indicating a plurality of candidate beam pairs for multiple-input multiple-output (MIMO) communication with a network node, wherein the plurality of candidate beam pairs includes a first beam pair and a second beam pair, wherein each beam of the plurality of candidate beam pairs has a spatial characteristic and a polarization characteristic. The one or more processors may be configured to receive a MIMO configuration for the first beam pair and the second beam pair, wherein a beam of the second beam pair is outside a beam avoidance region, wherein the beam avoidance region is defined based at least in part on the spatial characteristic of a beam of the first beam pair.

Some aspects described herein relate to a network node for wireless communication. The network node may include a memory and one or more processors coupled to the memory. The one or more processors may be configured to receive a measurement report indicating a plurality of candidate beam pairs for MIMO communication with a UE, wherein the plurality of candidate beam pairs includes a first beam pair and a second beam pair, wherein each beam of the plurality of candidate beam pairs has a spatial characteristic and a polarization characteristic. The one or more processors may be configured to transmit a MIMO configuration for the first beam pair and the second beam pair, wherein a beam of the second beam pair is outside a beam avoidance region, wherein the beam avoidance region is defined based at least in part on the spatial characteristic of a beam of the first beam pair.

Some aspects described herein relate to a method of wireless communication performed by a UE. The method may include transmitting a measurement report indicating a plurality of candidate beam pairs for MIMO communication with a network node, wherein the plurality of candidate beam pairs includes a first beam pair and a second beam pair, wherein each beam of the plurality of candidate beam pairs has a spatial characteristic and a polarization characteristic. The method may include receiving a MIMO configuration for the first beam pair and the second beam pair, wherein a beam of the second beam pair is outside a beam avoidance region, wherein the beam avoidance region is defined based at least in part on the spatial characteristic of a beam of the first beam pair.

Some aspects described herein relate to a method of wireless communication performed by a network node. The method may include receiving a measurement report indicating a plurality of candidate beam pairs for MIMO communication with a UE, wherein the plurality of candidate beam pairs includes a first beam pair and a second beam pair, wherein each beam of the plurality of candidate beam pairs has a spatial characteristic and a polarization characteristic. The method may include transmitting a MIMO configuration for the first beam pair and the second beam pair, wherein a beam of the second beam pair is outside a beam avoidance region, wherein the beam avoidance region is defined based at least in part on the spatial characteristic of a beam of the first beam pair.

Some aspects described herein relate to a non-transitory computer-readable medium that stores a set of instructions for wireless communication by a UE. The set of instructions, when executed by one or more processors of the UE, may cause the UE to transmit a measurement report indicating a plurality of candidate beam pairs for MIMO communication with a network node, wherein the plurality of candidate beam pairs includes a first beam pair and a second beam pair, wherein each beam of the plurality of candidate beam pairs has a spatial characteristic and a polarization characteristic. The set of instructions, when executed by one or more processors of the UE, may cause the UE to receive a MIMO configuration for the first beam pair and the second beam pair, wherein a beam of the second beam pair is outside a beam avoidance region, wherein the beam avoidance region is defined based at least in part on the spatial characteristic of a beam of the first beam pair.

Some aspects described herein relate to a non-transitory computer-readable medium that stores a set of instructions for wireless communication by a network node. The set of instructions, when executed by one or more processors of the network node, may cause the network node to receive a measurement report indicating a plurality of candidate beam pairs for MIMO communication with a UE, wherein the plurality of candidate beam pairs includes a first beam pair and a second beam pair, wherein each beam of the plurality of candidate beam pairs has a spatial characteristic and a polarization characteristic. The set of instructions, when executed by one or more processors of the network node, may cause the network node to transmit a MIMO configuration for the first beam pair and the second beam pair, wherein a beam of the second beam pair is outside a beam avoidance region, wherein the beam avoidance region is defined based at least in part on the spatial characteristic of a beam of the first beam pair.

Some aspects described herein relate to an apparatus for wireless communication. The apparatus may include means for transmitting a measurement report indicating a plurality of candidate beam pairs for MIMO communication with a network node, wherein the plurality of candidate beam pairs includes a first beam pair and a second beam pair, wherein each beam of the plurality of candidate beam pairs has a spatial characteristic and a polarization characteristic. The apparatus may include means for receiving a MIMO configuration for the first beam pair and the second beam pair, wherein a beam of the second beam pair is outside a beam avoidance region, wherein the beam avoidance region is defined based at least in part on the spatial characteristic of a beam of the first beam pair.

Some aspects described herein relate to an apparatus for wireless communication. The apparatus may include means for receiving a measurement report indicating a plurality of candidate beam pairs for MIMO communication with a UE, wherein the plurality of candidate beam pairs includes a first beam pair and a second beam pair, wherein each beam of the plurality of candidate beam pairs has a spatial characteristic and a polarization characteristic. The apparatus may include means for transmitting a MIMO configuration for the first beam pair and the second beam pair, wherein a beam of the second beam pair is outside a beam avoidance region, wherein the beam avoidance region is defined based at least in part on the spatial characteristic of a beam of the first beam pair.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating examples of beam management procedures, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
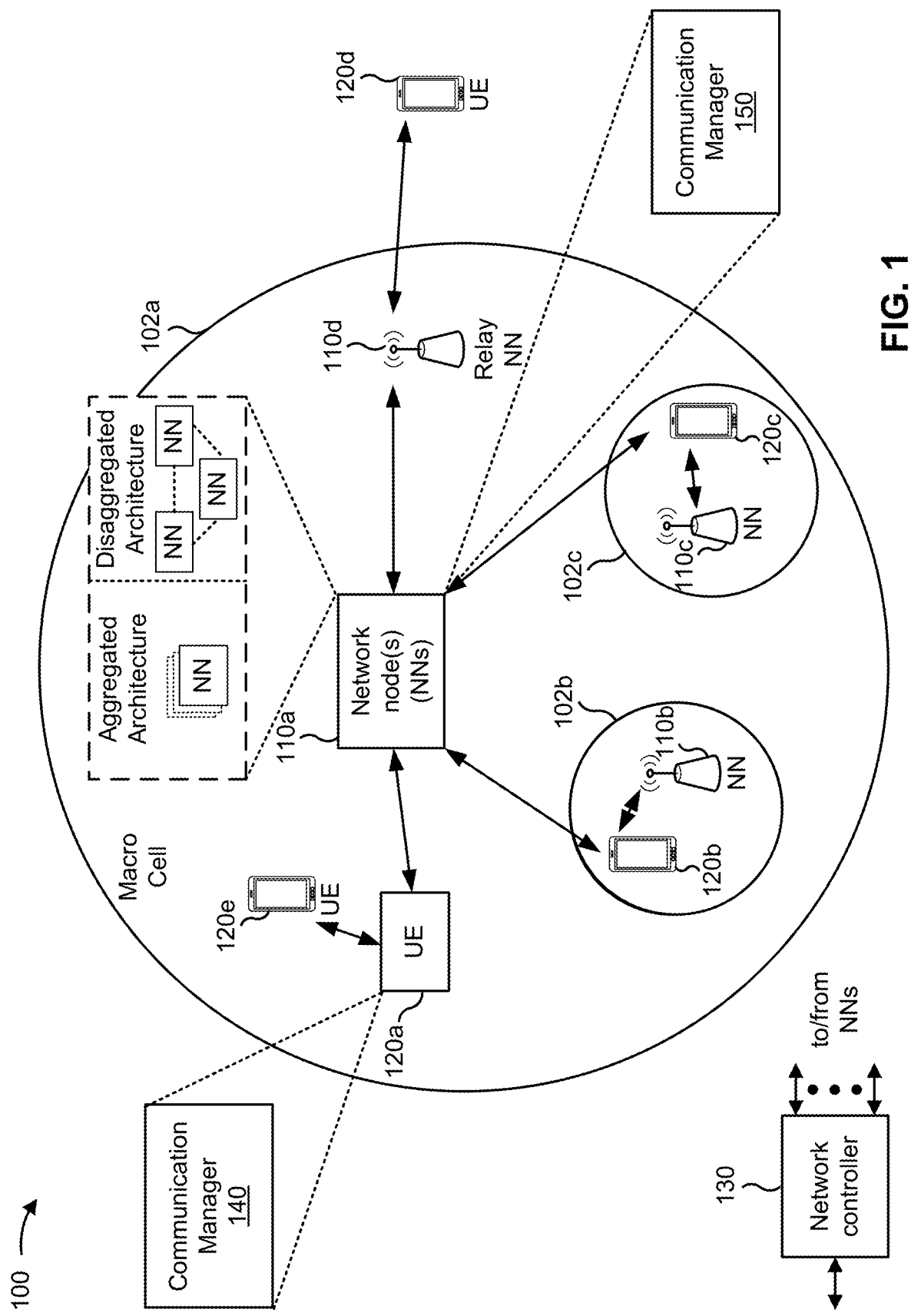
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit a measurement report indicating a plurality of candidate beam pairs for MIMO communication with a network node, wherein the plurality of candidate beam pairs includes a first beam pair and a second beam pair, wherein each beam of the plurality of candidate beam pairs has a spatial characteristic and a polarization characteristic; and receive a MIMO configuration for the first beam pair and the second beam pair, wherein a beam of the second beam pair is outside a beam avoidance region, wherein the beam avoidance region is defined based at least in part on the spatial characteristic of a beam of the first beam pair. Additionally, or alternatively, the communication manager 140 may perform one or more other operations described herein.

In some aspects, the network node 110 may include a communication manager 150. As described in more detail elsewhere herein, the communication manager 150 may receive a measurement report indicating a plurality of candidate beam pairs for MIMO communication with a UE, wherein the plurality of candidate beam pairs includes a first beam pair and a second beam pair, wherein each beam of the plurality of candidate beam pairs has a spatial characteristic and a polarization characteristic; and transmit a MIMO configuration for the first beam pair and the second beam pair, wherein a beam of the second beam pair is outside a beam avoidance region, wherein the beam avoidance region is defined based at least in part on the spatial characteristic of a beam of the first beam pair. Additionally, or alternatively, the communication manager 150 may perform one or more other operations described herein.

As indicated above, FIG. 1 is provided as an example. Other examples may differ from what is described with regard to FIG. 1.

Figure 2:
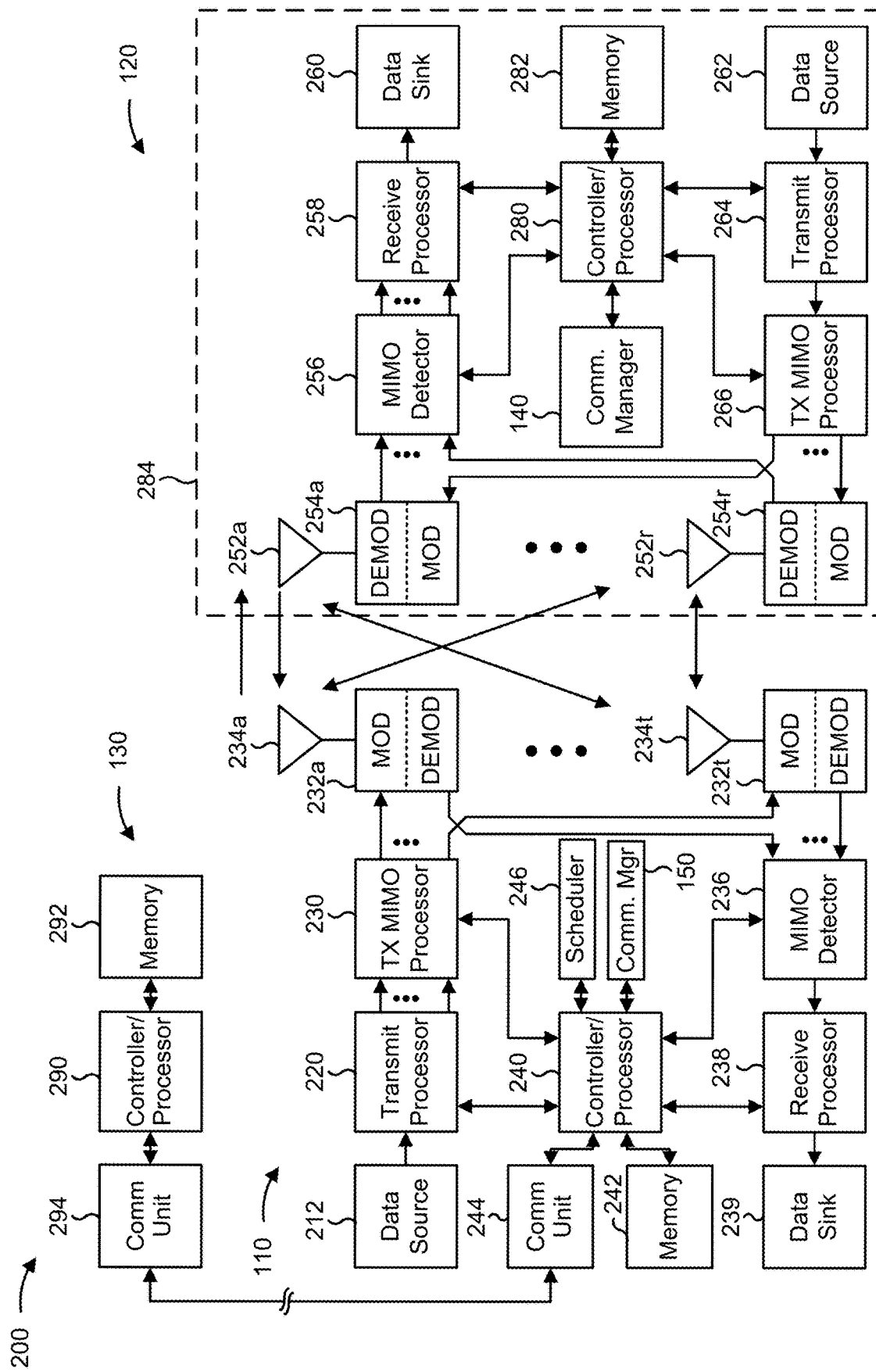
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

The controller/processor 240 of the network node 110, the controller/processor 280 of the UE 120, and/or any other component(s) of FIG. 2 may perform one or more techniques associated with higher-order MIMO communication, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., the UE 120) includes means for transmitting (e.g., using controller/processor 280, transmit processor 264, TX MIMO processor 266, modem 254, antenna 252, memory 282, or the like) a measurement report indicating a plurality of candidate beam pairs for MIMO communication with a network node, wherein the plurality of candidate beam pairs includes a first beam pair and a second beam pair, wherein each beam of the plurality of candidate beam pairs has a spatial characteristic and a polarization characteristic; and/or means for receiving (e.g., using antenna 252, modem 254, MIMO detector 256, receive processor 258, controller/processor 280, memory 282, or the like) a MIMO configuration for the first beam pair and the second beam pair, wherein a beam of the second beam pair is outside a beam avoidance region, wherein the beam avoidance region is defined based at least in part on the spatial characteristic of a beam of the first beam pair. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for receiving (e.g., using antenna 234, modem 232, MIMO detector 236, receive processor 238, controller/processor 240, memory 242, or the like) a measurement report indicating a plurality of candidate beam pairs for MIMO communication with a UE, wherein the plurality of candidate beam pairs includes a first beam pair and a second beam pair, wherein each beam of the plurality of candidate beam pairs has a spatial characteristic and a polarization characteristic; and/or means for transmitting (e.g., using controller/processor 240, transmit processor 220, TX MIMO processor 230, modem 232, antenna 234, memory 242, or the like) a MIMO configuration for the first beam pair and the second beam pair, wherein a beam of the second beam pair is outside a beam avoidance region, wherein the beam avoidance region is defined based at least in part on the spatial characteristic of a beam of the first beam pair. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
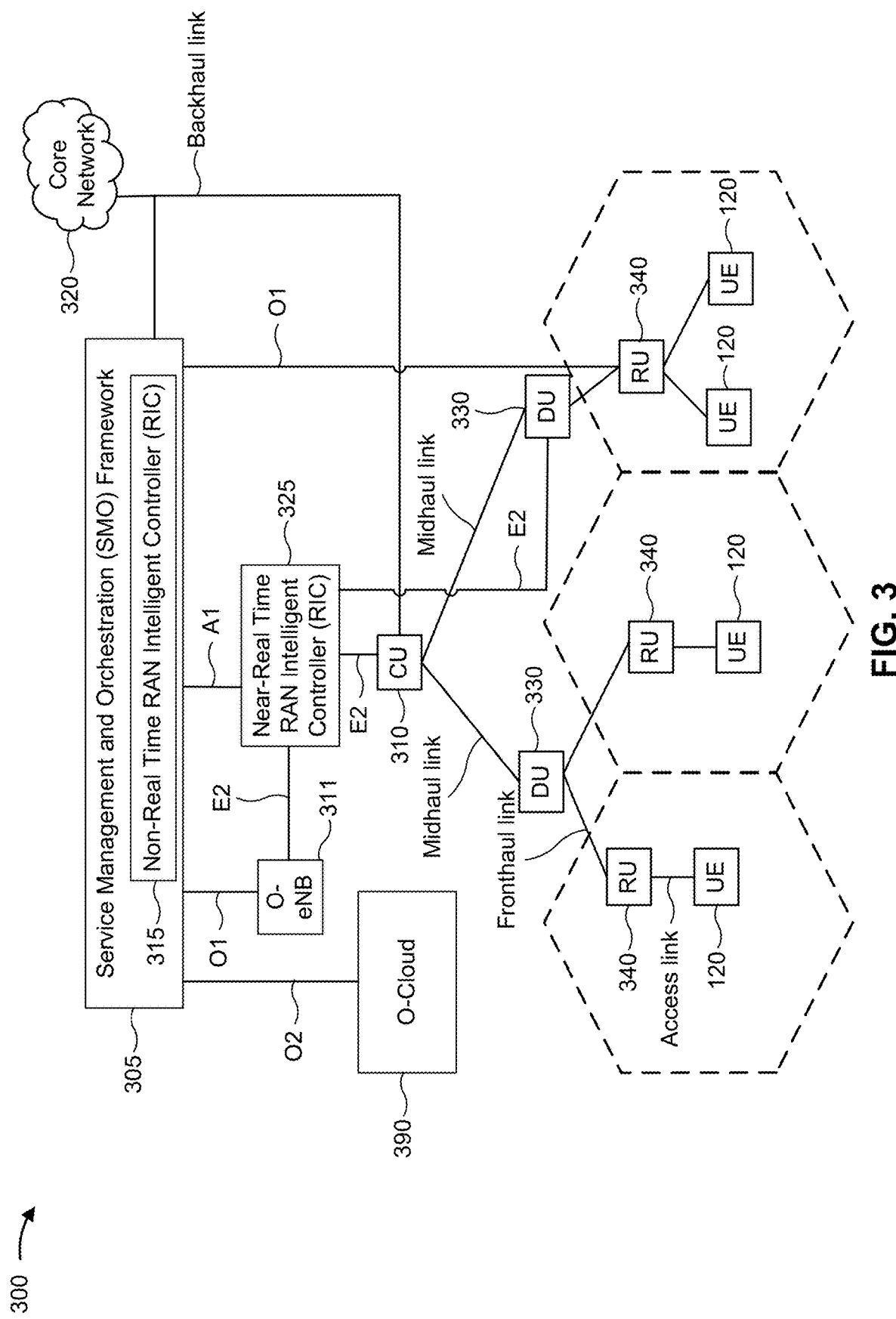
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIG. 4 is a diagram illustrating examples 400, 410, and 420 of channel state information (CSI) reference signal (RS) (CSI-RS) beam management procedures, in accordance with the present disclosure. As shown in FIG. 4, examples 400, 410, and 420 include a UE 120 in communication with a network node 110 in a wireless network (e.g., wireless network 100). However, the devices shown in FIG. 4 are provided as examples, and the wireless network may support communication and beam management between other devices (e.g., between a UE 120 and a network node 110 or transmit receive point (TRP), between a mobile termination node and a control node, between an integrated access and backhaul (IAB) child node and an IAB parent node, and/or between a scheduled node and a scheduling node). In some aspects, the UE 120 and the network node 110 may be in a connected state (e.g., an RRC connected state).

As shown in FIG. 4, example 400 may include a network node 110 (e.g., one or more network node devices such as an RU, a DU, and/or a CU, among other examples) and a UE 120 communicating to perform beam management using CSI-RSs. Example 400 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 4 and example 400, CSI-RSs may be configured to be transmitted from the network node 110 to the UE 120. The CSI-RSs may be configured to be periodic (e.g., using RRC signaling), semi-persistent (e.g., using media access control (MAC) control element (MAC-CE) signaling), and/or aperiodic (e.g., using downlink control information (DCI)).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same RS resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. As used herein, the term "beam pair" may refer to two beams from the UE 120 or the network node 110 having the same direction but different polarizations. In another possible implementation, the term "beam pair" may refer to one beam from the UE 120 and one beam from the network node 110. While example 400 has been described in connection with CSI-RSs, the first beam management process may also use synchronization signal blocks (SSBs) for beam management in a similar manner as described above.

As shown in FIG. 4, example 410 may include a network node 110 and a UE 120 communicating to perform beam management using CSI-RSs. Example 410 depicts a second beam management procedure (e.g., P2 CSI-RS beam management). The second beam management procedure may be referred to as a beam refinement procedure, a network node beam refinement procedure, a TRP beam refinement procedure, and/or a transmit beam refinement procedure. As shown in FIG. 4 and example 410, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 4, example 420 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 4 and example 420, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

As discussed in greater detail below, a beam management procedure, such as the first beam management procedure, may be used by the network node 110 and the UE 120 to identify and select multiple beam pairs for communication between the network node 110 and the UE 120. In some aspects, the beam pairs may be selected so as not to interfere with one another. For example, as discussed in greater detail below, beam pairs within a beam avoidance region may be excluded from consideration for MIMO communication between the network node 110 and UE 120.

As indicated above, FIG. 4 is provided as an example of beam management procedures. Other examples of beam management procedures may differ from what is described with respect to FIG. 4. For example, the UE 120 and the network node 110 may perform the third beam management procedure before performing the second beam management procedure, and/or the UE 120 and the network node 110 may perform a similar beam management procedure to select a UE transmit beam.

Figure 5A:
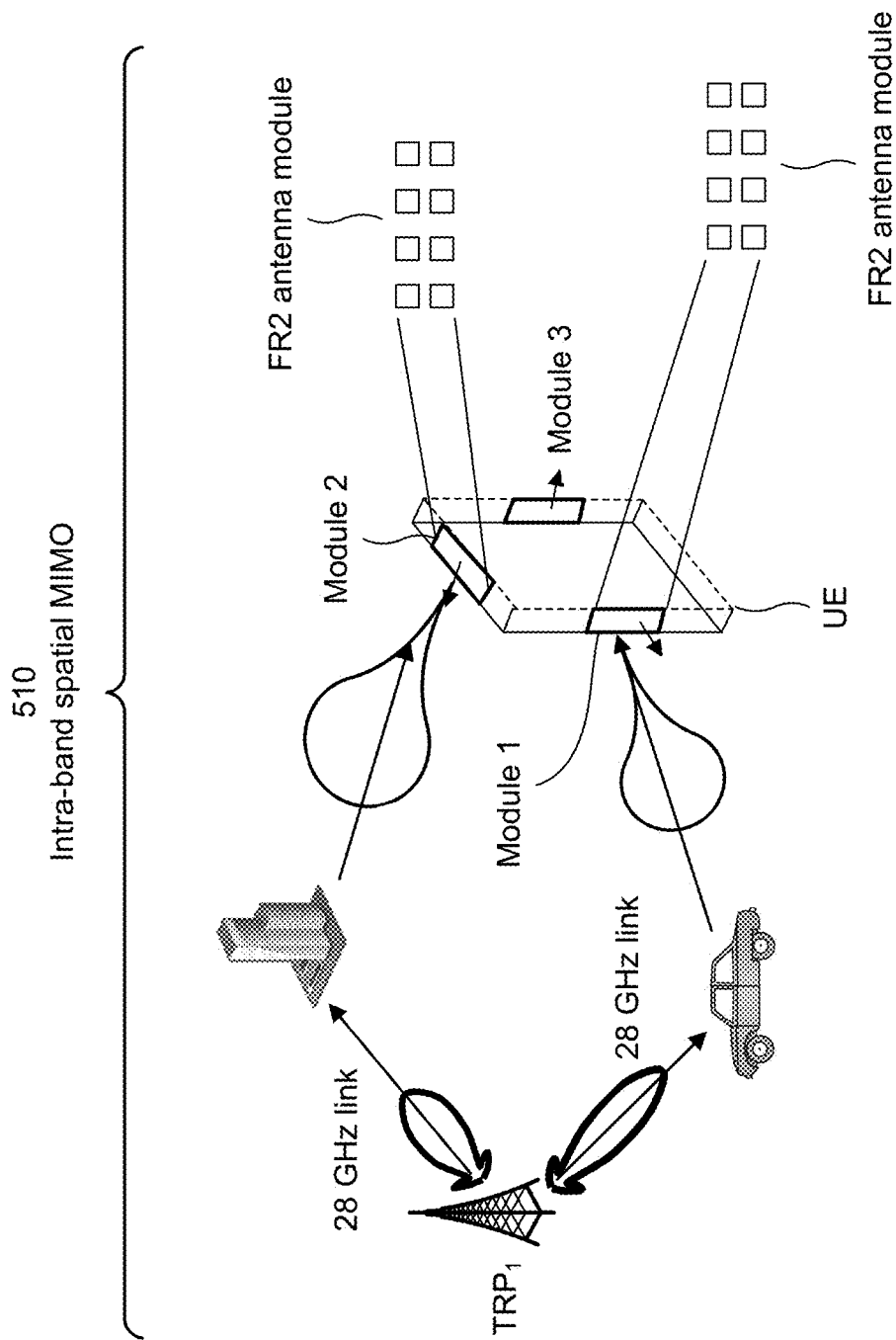
FIG. 5A is a diagram illustrating an example intra-band spatial multiple-input multiple-output (MIMO) carrier aggregation, in accordance with the present disclosure.

As shown in FIG. 5A, and by reference number 510, the multiple antenna modules of the UE may be operated in an intra-band spatial MIMO mode to transmit and/or receive mmW signals over different clusters (each cluster corresponds to reflection/propagation over different objects in the environment) in a wireless channel. For example, in an intra-band spatial MIMO mode, a single base station or network node (e.g., shown as $TRP_1$) operating at a particular frequency (e.g., 28 GHz) may transmit multiple beams toward different clusters in the wireless environment (e.g., a car roof and a building that act as reflectors), and the UE may generate beams from different antenna modules to receive the multiple beams. For example, the network node may transmit two layers toward each cluster (e.g., using polarization MIMO), and the UE may be able to decode the four layers using two different antenna modules. Accordingly, in the intra-band spatial MIMO mode, polarization MIMO techniques may be used with a higher rank in order to transmit and/or receive signals in a single frequency band using different antenna modules to form beams that are pointing in different directions.

Figure 5B:
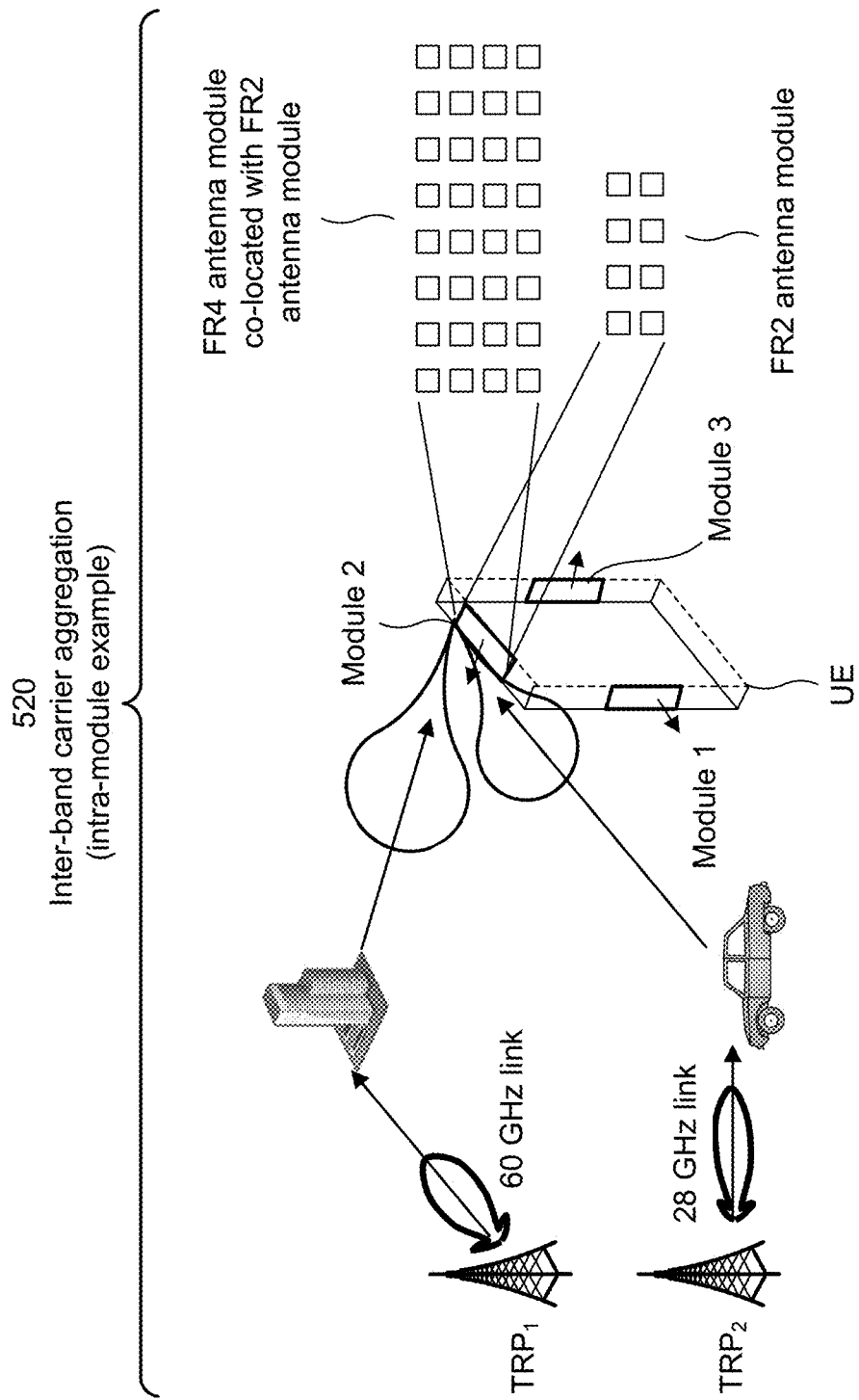
FIG. 5B is a diagram illustrating an example inter-band MIMO carrier aggregation, in accordance with the present disclosure.

Additionally, or alternatively, as shown in FIG. 5B, and by reference number 520, the multiple antenna modules of the UE may be operated in an inter-band carrier aggregation mode to transmit and/or receive mmW signals over the same cluster or over different clusters in a wireless channel. For example, in some aspects, the UE may include a multi-band antenna module (e.g., Module 2) with a first antenna module that can transmit and/or receive mmW signals in a first frequency band (e.g., an FR2 frequency band, such as 28 GHz) and a second co-located antenna module that can transmit and/or receive mmW signals in a second frequency band (e.g., an FR4 frequency band, such as 60 GHz). In an intra-module inter-band carrier aggregation mode, the UE may generate two beams (e.g., using polarization MIMO) from the same antenna module to transmit and/or receive signals in different frequency bands. Similarly, in an inter-module inter-band carrier aggregation mode, the UE may generate two beams from different antenna modules to transmit and/or receive signals in different frequency bands (e.g., different component carriers). Accordingly, the UE may generally support the inter-band carrier aggregation mode in cases where the UE has at least one multi-band antenna module, which may include a wideband antenna array that can operate at different frequency bands (e.g., 28 GHz and 60 GHz).

As indicated above, FIGS. 5A-5B are provided as an example. Other examples may differ from what is described with respect to FIGS. 5A-5B.

Figure 6:
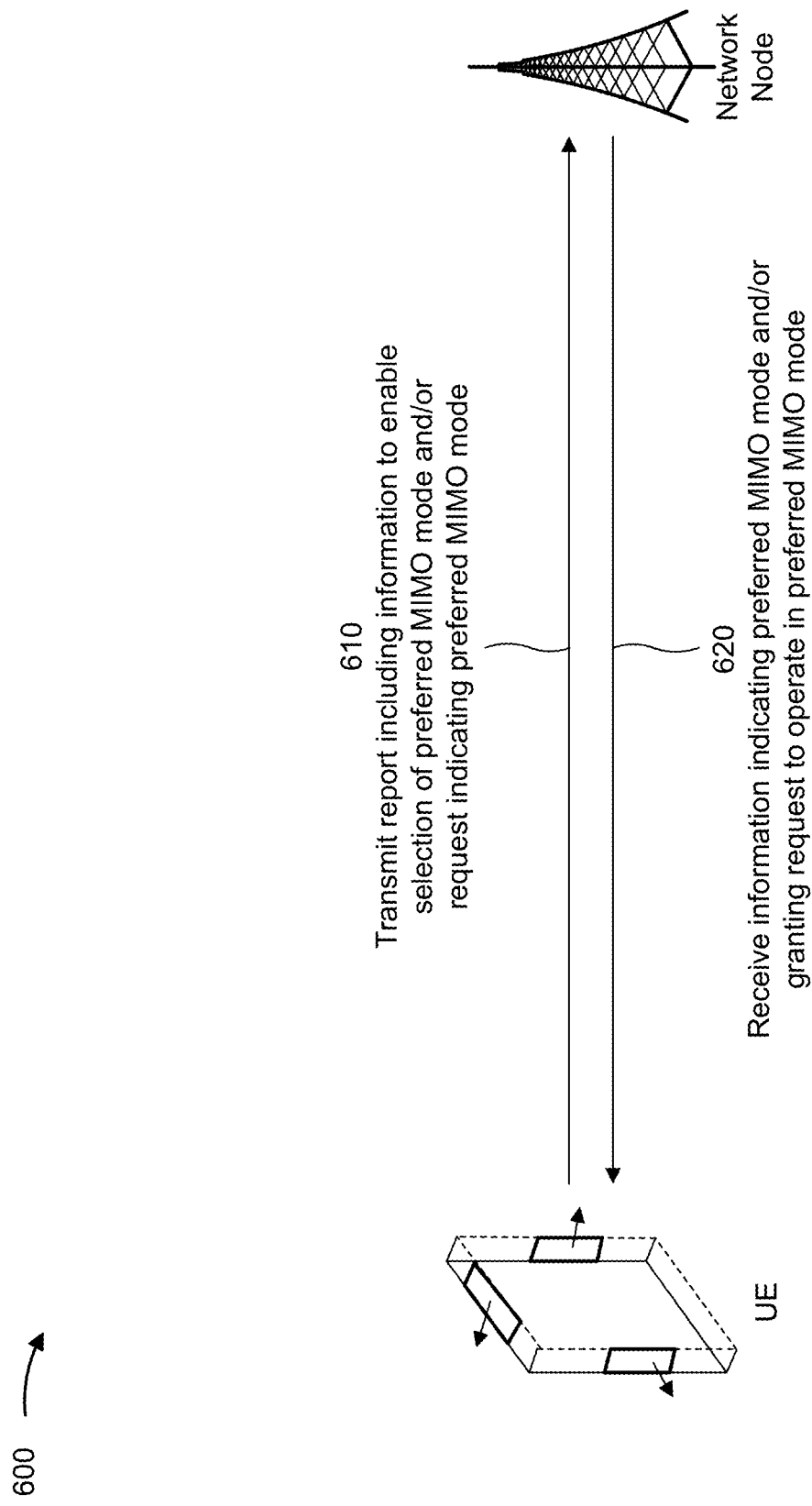
FIG. 6 is a diagram illustrating an example of switching between intra-band MIMO and inter-band carrier aggregation, in accordance with the present disclosure.

FIG. 6 is a diagram illustrating an example 600 of switching between intra-band MIMO and inter-band carrier aggregation, in accordance with the present disclosure. As shown in FIG. 6, example 600 includes a UE (e.g., UE 120 and/or the like) in communication with a base station or network node (e.g., network node 110 and/or the like) in a wireless network (e.g., wireless network 100 and/or the like). Furthermore, as described herein, the UE may generally include an antenna configuration with one or more antenna modules that support operation in different MIMO modes. For example, in some aspects, the different MIMO modes supported by the UE may include an intra-band spatial MIMO mode (e.g., as shown in FIG. 5A), an intra-module inter-band carrier aggregation mode (e.g., as shown in FIG. 5B), an inter-module inter-band carrier aggregation mode, and/or the like.

As shown in FIG. 6, and by reference number 610, the UE may transmit, and the network node may receive, a report that includes information to enable the base station to select a preferred MIMO mode for the UE. Additionally, or alternatively, as further shown by reference number 610, the UE may transmit, and the network node may receive, a request to operate one or more antenna modules of the UE in a preferred MIMO mode selected by the UE. For example, in some aspects, the selection of the preferred MIMO mode may be performed by the UE and/or the network node according to information that relates to multipath richness of a channel environment for different frequency bands, antenna module capabilities of the UE for different frequency bands, respective cell loadings in different frequency bands, a coarse location of the UE within a cell provided by the base station (e.g., cell-edge or cell-center), and/or the like.

Accordingly, in some aspects, the UE may obtain one or more measurements to quantify information related to multipath richness (or sparseness) of a wireless channel for different frequency bands. For example, during a beam training process, the base station may transmit a set of SSB beams, CSI-RS beams, and/or the like for different frequency bands in respective beam sweeps over a coverage area associated with the base station. The UE may determine a quantity of SSB or CSI-RS beams that satisfy a reference signal received power (RSRP) threshold for each frequency band (e.g., band-specific RSRP thresholds configured by the base station), and the respective quantities of SSB or CSI-RS beams that satisfy the RSRP threshold may provide a measure of the multipath richness (or sparseness) of the channel environment for the different frequency bands in terms of a number of good clusters that are observed at the UE for each frequency band. In this way, the UE and/or the network node may select a preferred MIMO mode based at least in part on the number of good clusters in each frequency band (e.g., the number of SSB or CSI-RS beams in each frequency band that satisfy the RSRP threshold).

As further shown in FIG. 6, and by reference number 620, the network node may transmit, and the UE may receive, information indicating the preferred MIMO mode in which to operate the one or more antenna modules of the UE or information granting the UE's request to operate in the preferred MIMO mode selected by the UE. For example, as described above, the UE may transmit information including a measure of the multipath richness of the wireless channel environment in terms of a number of good clusters observed by the UE in different frequency bands and information related to the antenna module capabilities of the UE in different frequency bands to enable the base station to select the preferred MIMO mode, which may then be indicated to the UE. Additionally, or alternatively, the UE may request to operate in a preferred MIMO mode that is selected by the UE according to the various factors described in further detail above, and the base station may either grant the request or indicate that the UE is to operate in a different MIMO mode (e.g., the base station may override a request of the UE to operate in the intra-band spatial MIMO mode in order to balance a load across spectrum using inter-band carrier aggregation). Accordingly, the UE may operate the one or more antenna modules according to the MIMO mode indicated by the base station, and the UE and the base station may continue to communicate according to the coordinated MIMO mode. For example, in some aspects, intra-band spatial MIMO and inter-band carrier aggregation may be associated with different signaling protocols, whereby the UE and the base station may need to coordinate the MIMO mode in which the UE is operating at a given time. Furthermore, in this way, the UE and the network node may cooperatively determine the preferred MIMO mode to optimize performance for the UE and the network based at least in part on various advantages and tradeoffs associated with the different MIMO modes supported by the UE.

As indicated above, FIG. 6 is provided as an example. Other examples may differ from what is described with respect to FIG. 6.

Millimeter wave systems are often implemented using 2-port (or 2-layer (2L)) transmissions. These 2-port transmissions typically correspond to polarization MIMO where the network node, such as a gNB, transmits over two polarizations. Examples of polarizations may include vertical and horizontal, slant-45 and slant minus-45, left handed circular/elliptical and right handed circular/elliptical, or the like. In such instances, the UE may receive polarized transmissions with a dual-polarized array.

As higher-order millimeter wave systems advance, beam selection becomes a more significant problem. In a typical 2L scenario, the selected beam pair is the one that maximizes the RSRP over SSBs. Another approach is to select the beam pair that maximizes spectral efficiency using 2-port CSI-RS signals. Approaches for selecting beam pairs for 2L transmissions may not be satisfactory when selecting beam pairs for higher-order millimeter wave systems implementing, for example, 4-layer (4L) transmissions or >4L transmissions, such as 8-layer (8L) transmissions, 16-layer (16L) transmissions, and so on. For instance, if the UE uses RSRPs as a metric for beam selection, neighboring beams with strong RSRP values may be selected as beam pairs for MIMO communication with the network node. Neighboring beams are more likely to interfere with one another, however, effectively reducing network performance.

Some techniques and apparatuses described herein provide for transmitting a measurement report indicating a plurality of candidate beam pairs for MIMO communication with a network node, wherein the plurality of candidate beam pairs includes a first beam pair and a second beam pair, wherein each beam of the plurality of candidate beam pairs has a spatial characteristic and a polarization characteristic; and receiving a MIMO configuration for the first beam pair and the second beam pair, wherein a beam of the second beam pair is outside a beam avoidance region, wherein the beam avoidance region is defined, at least in part, on the spatial characteristic of a beam of the first beam pair. Accordingly, MIMO configurations with beam pairs having beams outside the beam avoidance region reduces the likelihood that a beam from one beam pair will interfere with a beam from another beam pair. Reducing interference can improve the operation of the UE. For example, less interference between beams may result in fewer retransmissions of data, which can improve network performance and reduce energy expenditure.

Some techniques and apparatuses described herein provide for receiving a measurement report indicating a plurality of candidate beam pairs for MIMO communication with a UE, wherein the plurality of candidate beam pairs includes a first beam pair and a second beam pair, wherein each beam of the plurality of candidate beam pairs has a spatial characteristic and a polarization characteristic; and transmitting a MIMO configuration for the first beam pair and the second beam pair, wherein a beam of the second beam pair is outside a beam avoidance region, wherein the beam avoidance region is defined, at least in part, on the spatial characteristic of a beam of the first beam pair. Accordingly, the network node can configure the UE to communicate via beam pairs that are less likely to interfere with one another during MIMO communication.

Figure 7:
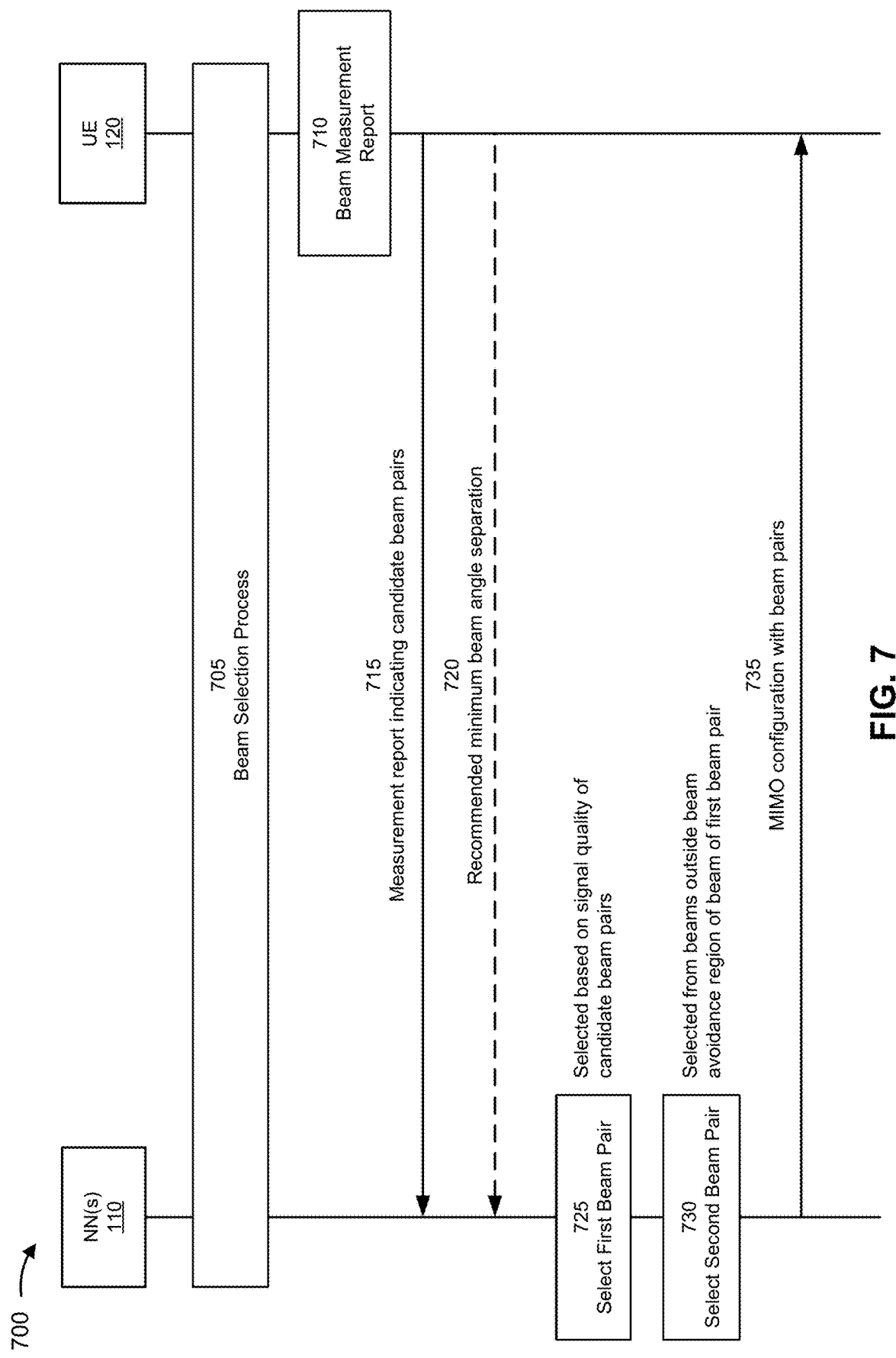
FIG. 7 is a diagram of an example signal flow for beam selection for higher-order MIMO communication, in accordance with the present disclosure.

FIG. 7 is a diagram of an example 700 associated with beam selection for higher-order (e.g., 4L or greater) MIMO communication, in accordance with the present disclosure. As shown in FIG. 7, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 7.

As shown by reference number 705, the UE and the network node may perform a beam selection procedure. The beam selection procedure may include the first beam management procedure discussed above with respect to FIG. 4. For example, the network node may perform a beam sweep over multiple Tx beams. The network node may use a transmit beam to transmit (e.g., with repetitions) each CSI-RS at multiple times with the same RS resource set so that the UE can sweep through receive beams in multiple transmission instances. As a result, the UE may measure CSI-RSs on different transmit beams using different receive beams. The measurement may be used to identify a signal quality associated with the beam pairs measured during the beam selection procedure. The signal quality may quantify a signal strength of the beam pair. Accordingly, the signal quality may represent the likelihood of successful communication on the beam pair. The signal quality may be represented by a transmission configuration indicator (TCI) state associated with the beam pair. The TCI state may include other information, such as a quasi co-location (QCL) type.

As shown by reference number 710, the UE may generate a measurement report indicating multiple candidate beam pairs. The candidate beam pairs may include different combinations of Tx and Rx beams associated with the UE, the network node, or both. Each beam of the candidate beam pairs may have a spatial characteristic and a polarization characteristic. The spatial characteristic may indicate the direction of the beam. The polarization characteristic may indicate the polarity/polarization of the beam. In some aspects, beams in a beam pair may have the same spatial characteristic but different polarization characteristics. The measurement report may further indicate the signal quality of each candidate beam pair. For example, the measurement report may include the TCI state for each candidate beam pair.

As shown by reference number 715, the UE may transmit, and the network node may receive, the measurement report indicating the candidate beam pairs. The UE may transmit the measurement report on an UL channel.

As shown by reference number 720, the UE may transmit, and the network node may receive, a recommended minimum beam angle separation between two beams of different candidate beam pairs for MIMO communication. The recommended minimum beam angle separation may define an angle or a range of angles relative to a direction of a beam where interference above a signal strength threshold with that beam is likely to occur. The recommended minimum beam angle separation may be based at least in part on an antenna array size used at the network node, an antenna array size used at the UE, and/or a combination thereof. A larger antenna array size may indicate a narrower recommended minimum beam angle separation. A smaller antenna array size may indicate a wider recommended minimum beam angle separation.

As shown by reference number 725, the network node may select a first beam pair. The first beam pair may be selected from among the candidate beam pairs indicated in the measurement report transmitted by the UE, as shown by reference number 715. In some aspects, the first beam pair may be a beam pair, of the candidate beam pairs, with the highest signal quality for polarization MIMO communication. The beam information may be indicated by the TCI state selected.

As shown by reference number 730, the network node may select a second beam pair. The second beam pair may be selected from among the candidate beam pairs indicated in the measurement report transmitted by the UE, as shown by reference number 715. In some aspects, the second beam pair may be selected from among the candidate beam pairs with the highest signal quality and with beams outside a beam avoidance region. The beam avoidance region may be defined according to a spatial characteristic of a beam of the first beam pair selected at reference number 725. In some aspects, the beam avoidance region may be defined by the recommended minimum beam angle separation. In some aspects, the beam avoidance region may be defined by an angle separation determined by the network node. For example, the network node may determine the angle separation in instances where no recommended minimum beam angle separation is transmitted by the UE. In some aspects, the angle separation may be determined by the network node according to an antenna array size used at the network node, an antenna array size used at the UE, and/or a combination thereof. In some aspects, such as instances where the network node includes multiple panels, the beam avoidance region may be defined according to a boresight direction of one or more panels of the network node. In one aspect, the beam avoidance region may be defined to include beams in the same direction as the panel of the network node. In another aspect, the beam avoidance region may be defined to include beams within the beam angle separation, relative to the direction of the panel of the antenna.

In some aspects, the signal quality of the first beam pair is higher than the signal quality of the second beam pair. In some aspects, a signal quality of a third beam pair is higher than a signal quality of the second beam pair but a beam of the third beam pair has a spatial characteristic within the beam avoidance region relative to the first beam pair. As described above, the signal quality may be indicated by the TCI state associated with the beam pair in the measurement report. Accordingly, the network node may determine that the third beam pair is more likely to cause interference with transmissions from the first beam pair, and select the first beam pair and the second beam pair for MIMO communications with the UE because the second beam pair is less likely to cause interference with the first beam pair, even though the signal quality, as indicated in the measurement report, for communications via the third beam pair is higher than the signal quality for communications via the second beam pair.

As shown by reference number 735, the network node may transmit, and the UE may receive, a MIMO configuration with the selected beam pairs. The MIMO configuration may be transmitted on a DL channel and may indicate that MIMO communications are to occur on the first beam pair and the second beam pair. The UE may configure itself based at least in part on the MIMO configuration.

As indicated above, FIG. 7 is provided as an example. Other examples may differ from what is described with respect to FIG. 7.

Figure 8:
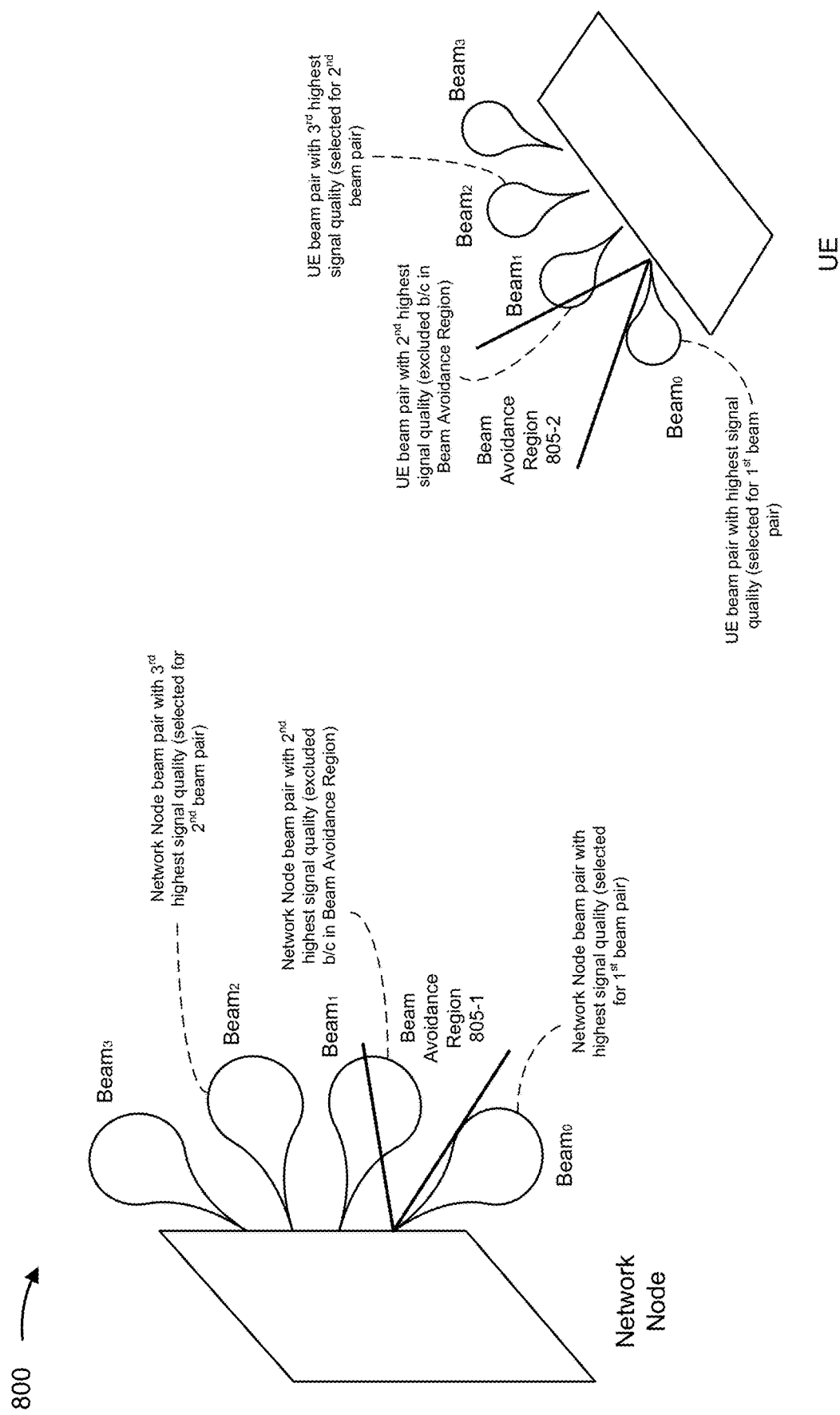
FIG. 8 is a diagram illustrating an example beam selection for higher-order MIMO communication, in accordance with the present disclosure.

FIG. 8 is a diagram illustrating an example 800 associated with beam selection for higher-order (e.g., 4L or greater) MIMO communication, in accordance with the present disclosure. As shown in FIG. 8, example 800 includes communication between a network node (such as network node 110) and a UE (such as UE 120). In some aspects, the network node and UE may be included in a wireless network, such as wireless network 100. The network node and UE may communicate via a wireless access link, which may include an uplink and a downlink.

As shown in FIG. 8, the beam avoidance region 805 is defined according to a beam angle separation relative to a beam of the first beam pair. Two beam avoidance regions 805 are shown. A first beam avoidance region 805-1 is associated with the first beam pair (Beam$_0$) of the network node. A second beam avoidance region 805-2 is associated with the first beam pair (Beam$_0$) of the UE. Each of the first beam pairs (Beam$_0$ of the network node and Beam$_0$ of the UE) may be selected by the network node for MIMO communication with the UE as a result of the measurement report indicating that Beam$_0$ of the network node has the best TCI state for polarization MIMO communication, and Beam$_0$ of the UE has the best signal quality among the beam pairs of the UE. Each of the second beam pairs (Beam$_2$ of the network node and Beam$_2$ of the UE) may be selected as the other beam pair for MIMO communication as a result of Beam$_2$ of the network node having the best TCI state for polarization MIMO communication among the beams of the network node outside the beam avoidance region. Similarly Beam$_2$ of the UE may have the best signal quality from among the beams of the UE outside the beam avoidance region of Beam$_0$ of the UE.

In one example, another beam pair (Beam$_1$ of the network node and Beam$_1$ of the UE) referred to as a "third beam pair" may have a better signal quality than the second beam pair. In this example, however, the third beam pair may be excluded because the beams of the third beam pair have a spatial characteristic within the beam avoidance region relative to the beams of the first beam pair.

In some aspects, the beam avoidance region is the beam angle separation, as discussed above. The beam angle separation may depend upon the antenna array sizes of the network node, the UE, and/or a combination thereof. In some aspects, the beam avoidance region is imposed on beams of the network node, the UE, and/or a combination thereof. For example, the beam avoidance region may apply only to beams of the network node, only to beams of the UE, or to beams of both the UE and the network node.

In some aspects, the beam angle separation may be configured based on an agreement between the network node and the UE. If the beam angle separation is too large, higher-order MIMO communication may not be possible for the UE. If the beam angle separation is too small, inter-beam interference may dominate higher-order MIMO communication performance. Accordingly, the UE and the network node may exchange information regarding the capabilities of the UE, the network node, or both, to confirm that MIMO communication is possible without significantly affecting network performance.

The agreement between the UE and the network node may occur during a signaling exchange. In some aspects, the UE, the network node, or both may recommend a minimum beam angle separation to be used by the other. In some aspects, the UE, the network node, or both, may report the beam angle separation between Tx/Rx beams to the other. The recommended minimum beam angle separation and/or the beam angle separation between Tx/Rx beams may be used for the beam selection process, discussed above.

In some aspects, the network node may include multiple panels oriented in a way such that two or more panels have the same boresight direction. In that instance, a mutual exclusion from a good beam in one panel may be applied to other panels serving higher-order MIMO. For example, other beams on the panel with the best beam (e.g., the beam with the highest RSRP) may be excluded from beam pairs for higher-order MIMO communication since beams on the same panel may be more likely to interfere with one another during higher-order MIMO communications.

As indicated above, FIG. 8 is provided as an example. Other examples may differ from what is described with respect to FIG. 8.

Figure 9:
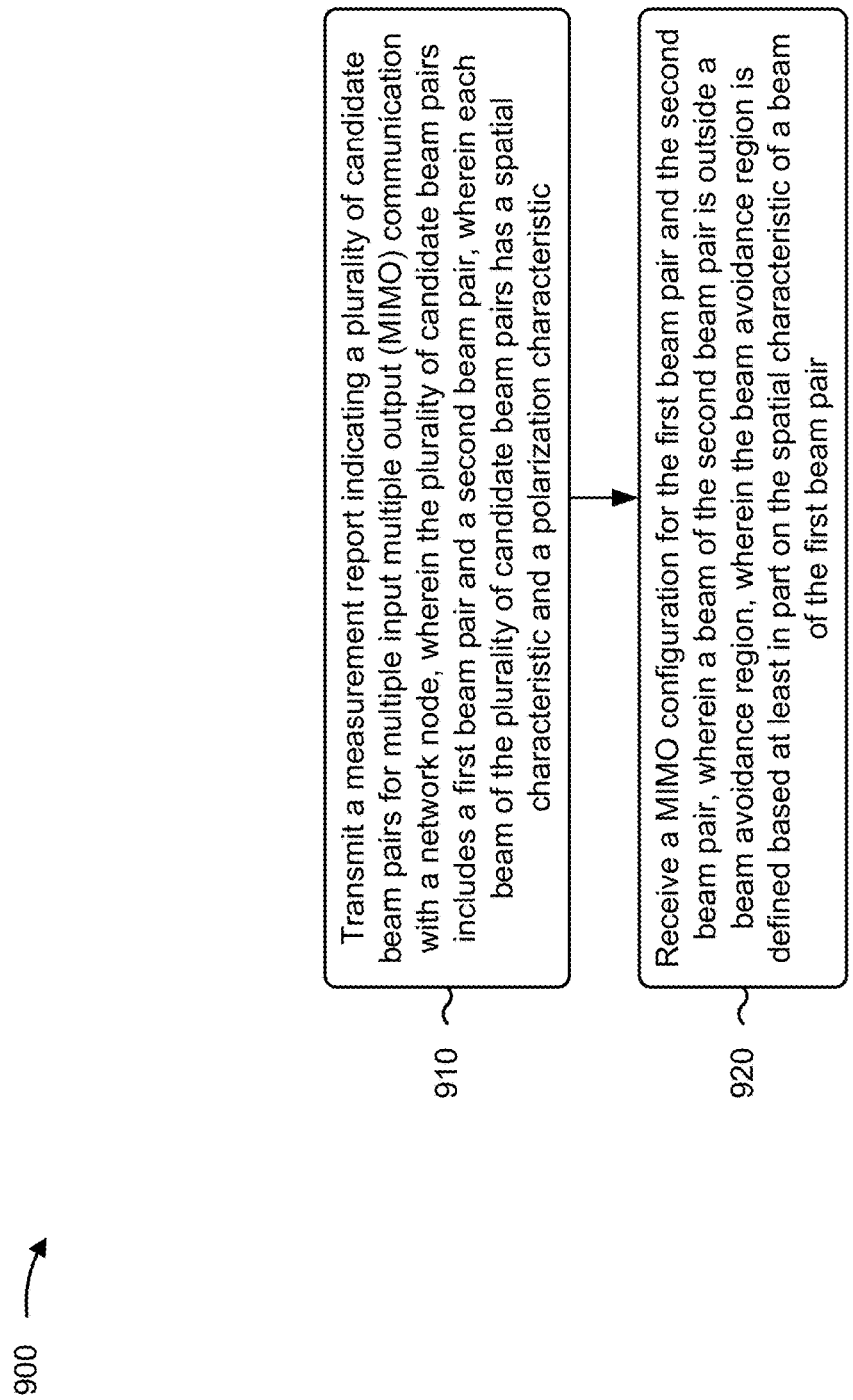
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with beam selection for higher-order MIMO communication.

As shown in FIG. 9, in some aspects, process 900 may include transmitting a measurement report indicating a plurality of candidate beam pairs for MIMO communication with a network node, wherein the plurality of candidate beam pairs includes a first beam pair and a second beam pair, wherein each beam of the plurality of candidate beam pairs has a spatial characteristic and a polarization characteristic (block 910). For example, the UE (e.g., using communication manager 140 and/or transmission component 1104, depicted in FIG. 11) may transmit a measurement report indicating a plurality of candidate beam pairs for MIMO communication with a network node, wherein the plurality of candidate beam pairs includes a first beam pair and a second beam pair, wherein each beam of the plurality of candidate beam pairs has a spatial characteristic and a polarization characteristic, as described above, for example, with reference to FIGS. 4, 5A, 5B, 6, 7, and/or 8.

As further shown in FIG. 9, in some aspects, process 900 may include receiving a MIMO configuration for the first beam pair and the second beam pair, wherein a beam of the second beam pair is outside a beam avoidance region, wherein the beam avoidance region is defined, at least in part, on the spatial characteristic of a beam of the first beam pair (block 920). For example, the UE (e.g., using communication manager 140 and/or reception component 1102, depicted in FIG. 11) may receive a MIMO configuration for the first beam pair and the second beam pair, wherein a beam of the second beam pair is outside a beam avoidance region, wherein the beam avoidance region is defined, at least in part, on the spatial characteristic of a beam of the first beam pair, as described above, for example, with reference FIGS. 4, 5A, 5B, 6, 7, and/or 8.

Process 900 may include additional aspects, such as any single aspect or any combination of aspects described below and/or in connection with one or more other processes described elsewhere herein.

In a first aspect, process 900 includes performing a beam selection process to identify a signal quality of each of the plurality of candidate beam pairs.

In a second aspect, alone or in combination with the first aspect, process 900 includes generating the measurement report to include the signal quality of each of the plurality of candidate beam pairs.

In a third aspect, alone or in combination with one or more of the first and second aspects, the signal quality of the first beam pair is greater than the signal quality of the second beam pair.

In a fourth aspect, alone or in combination with one or more of the first through third aspects, the plurality of candidate beam pairs includes a third beam pair omitted from the MIMO configuration, wherein the signal quality of the third beam pair is greater than the signal quality of the second beam pair, and wherein one or more beams of the third beam pair have the spatial characteristic within the beam avoidance region.

In a fifth aspect, alone or in combination with one or more of the first through fourth aspects, the beam avoidance region is defined by an angle separation relative to the beam of the first beam pair.

In a sixth aspect, alone or in combination with one or more of the first through fifth aspects, the angle separation is based at least in part on an antenna array size used at the network node.

In a seventh aspect, alone or in combination with one or more of the first through sixth aspects, the angle separation is based at least in part on an antenna array size used at the UE.

In an eighth aspect, alone or in combination with one or more of the first through seventh aspects, the first beam pair and the second beam pair are configured according to a minimum beam angle separation between the spatial characteristic of the beam of the first beam pair and the spatial characteristic of the beam of the second beam pair.

In a ninth aspect, alone or in combination with one or more of the first through eighth aspects, process 900 includes selecting one or more of the first beam pair or the second beam pair based at least in part on the minimum beam angle separation.

In a tenth aspect, alone or in combination with one or more of the first through ninth aspects, process 900 includes transmitting a recommended minimum beam angle separation between the spatial characteristic of the beam of the first beam pair and the spatial characteristic of the beam of the second beam pair.

In an eleventh aspect, alone or in combination with one or more of the first through tenth aspects, the first beam pair and the second beam pair are configured based at least in part on the recommended minimum beam angle separation.

In a twelfth aspect, alone or in combination with one or more of the first through eleventh aspects, the beam avoidance region is based, at least in part, on a boresight direction of one or more panels of the network node.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
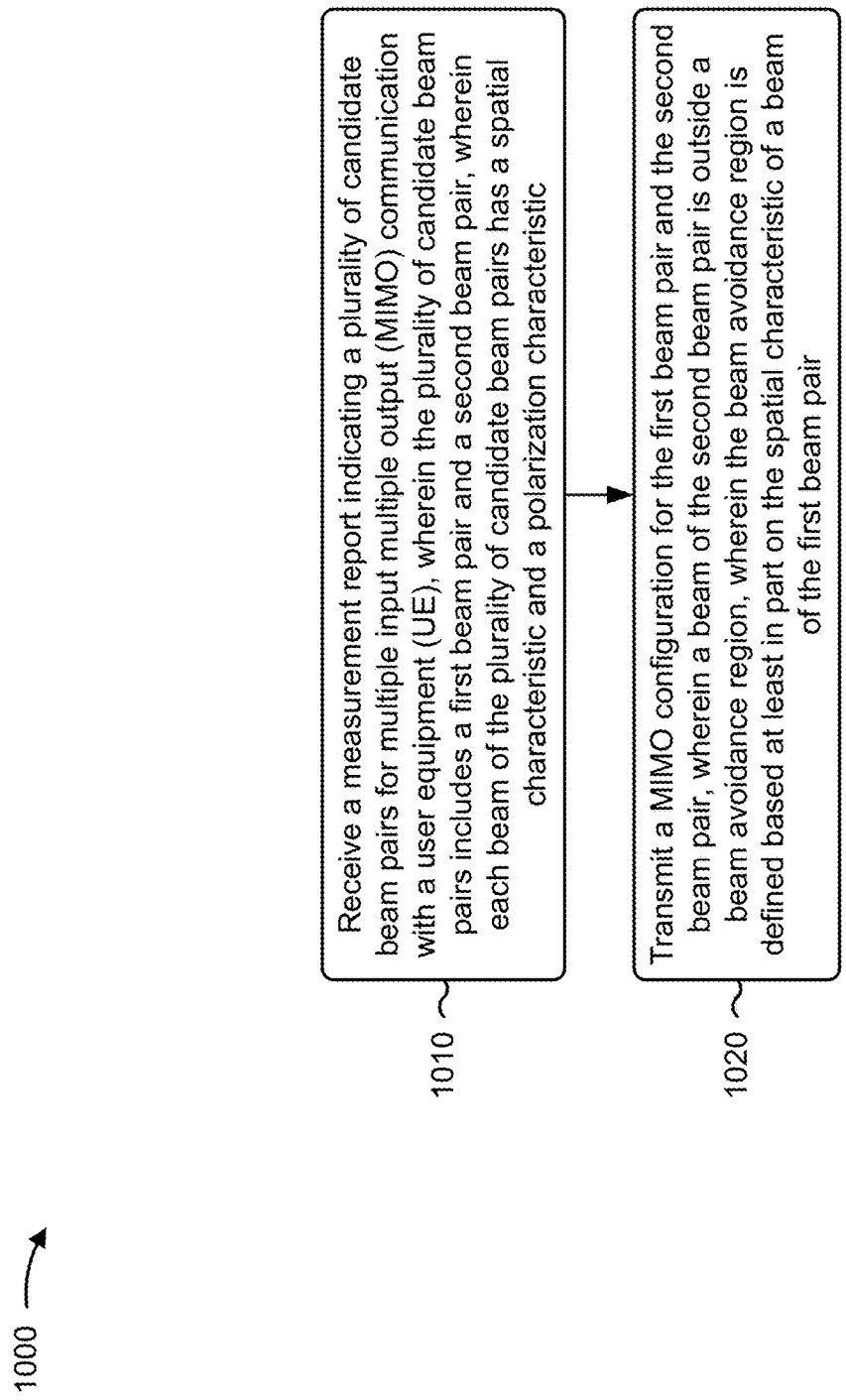
FIG. 10 is a diagram illustrating an example process performed, for example, by a network node, in accordance with the present disclosure.

FIG. 10 is a diagram illustrating an example process 1000 performed, for example, by a network node, in accordance with the present disclosure. Example process 1000 is an example where the network node (e.g., network node 110) performs operations associated with beam selection for higher-order MIMO communication.

As shown in FIG. 10, in some aspects, process 1000 may include receiving a measurement report indicating a plurality of candidate beam pairs for MIMO communication with a UE, wherein the plurality of candidate beam pairs includes a first beam pair and a second beam pair, wherein each beam of the plurality of candidate beam pairs has a spatial characteristic and a polarization characteristic (block 1010). For example, the network node (e.g., using communication manager 150 and/or reception component 1202, depicted in FIG. 12) may receive a measurement report indicating a plurality of candidate beam pairs for MIMO communication with a UE, wherein the plurality of candidate beam pairs includes a first beam pair and a second beam pair, wherein each beam of the plurality of candidate beam pairs has a spatial characteristic and a polarization characteristic, as described above, for example, with reference to FIGS. 4, 5A, 5B, 6, 7, and/or 8.

As further shown in FIG. 10, in some aspects, process 1000 may include transmitting a MIMO configuration for the first beam pair and the second beam pair, wherein a beam of the second beam pair is outside a beam avoidance region, wherein the beam avoidance region is defined, at least in part, on the spatial characteristic of a beam of the first beam pair (block 1020). For example, the network node (e.g., using communication manager 150 and/or transmission component 1204, depicted in FIG. 12) may transmit a MIMO configuration for the first beam pair and the second beam pair, wherein a beam of the second beam pair is outside a beam avoidance region, wherein the beam avoidance region is defined, at least in part, on the spatial characteristic of a beam of the first beam pair, as described above, for example, with reference FIGS. 4, 5A, 5B, 6, 7, and/or 8.

Process 1000 may include additional aspects, such as any single aspect or any combination of aspects described below and/or in connection with one or more other processes described elsewhere herein.

In a first aspect, process 1000 includes determining a signal quality of each of the plurality of candidate beam pairs based at least in part on the measurement report.

In a second aspect, alone or in combination with the first aspect, the signal quality of the first beam pair is greater than the signal quality of the second beam pair.

In a third aspect, alone or in combination with one or more of the first and second aspects, process 1000 includes omitting a third beam pair, of the plurality of candidate beam pairs, from the MIMO configuration, wherein the signal quality of the third beam pair is greater than the signal quality of the second beam pair, and wherein one or more beams of the third beam pair have the spatial characteristic within the beam avoidance region.

In a fourth aspect, alone or in combination with one or more of the first through third aspects, the beam avoidance region is defined by an angle separation relative to the beam of the first beam pair.

In a fifth aspect, alone or in combination with one or more of the first through fourth aspects, the angle separation is based at least in part on an antenna array size used at the network node.

In a sixth aspect, alone or in combination with one or more of the first through fifth aspects, the angle separation is based at least in part on an antenna array size used at the UE.

In a seventh aspect, alone or in combination with one or more of the first through sixth aspects, the first beam pair and the second beam pair are configured according to a minimum beam angle separation between the spatial characteristic of the beam of the first beam pair and the spatial characteristic of the beam of the second beam pair.

In an eighth aspect, alone or in combination with one or more of the first through seventh aspects, process 1000 includes selecting one or more of the first beam pair or the second beam pair based at least in part on the minimum beam angle separation.

In a ninth aspect, alone or in combination with one or more of the first through eighth aspects, process 1000 includes receiving a recommended minimum beam angle separation between the spatial characteristic of the beam of the first beam pair and the spatial characteristic of the beam of the second beam pair.

In a tenth aspect, alone or in combination with one or more of the first through ninth aspects, process 1000 includes configuring the first beam pair and the second beam pair according to the recommended minimum beam angle separation.

In an eleventh aspect, alone or in combination with one or more of the first through tenth aspects, the beam avoidance region is based, at least in part, on a boresight direction of one or more panels of the network node.

In a twelfth aspect, alone or in combination with one or more of the first through eleventh aspects, the beam avoidance region includes beams from multiple panels of the network node, wherein the multiple panels are oriented with the same boresight direction.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
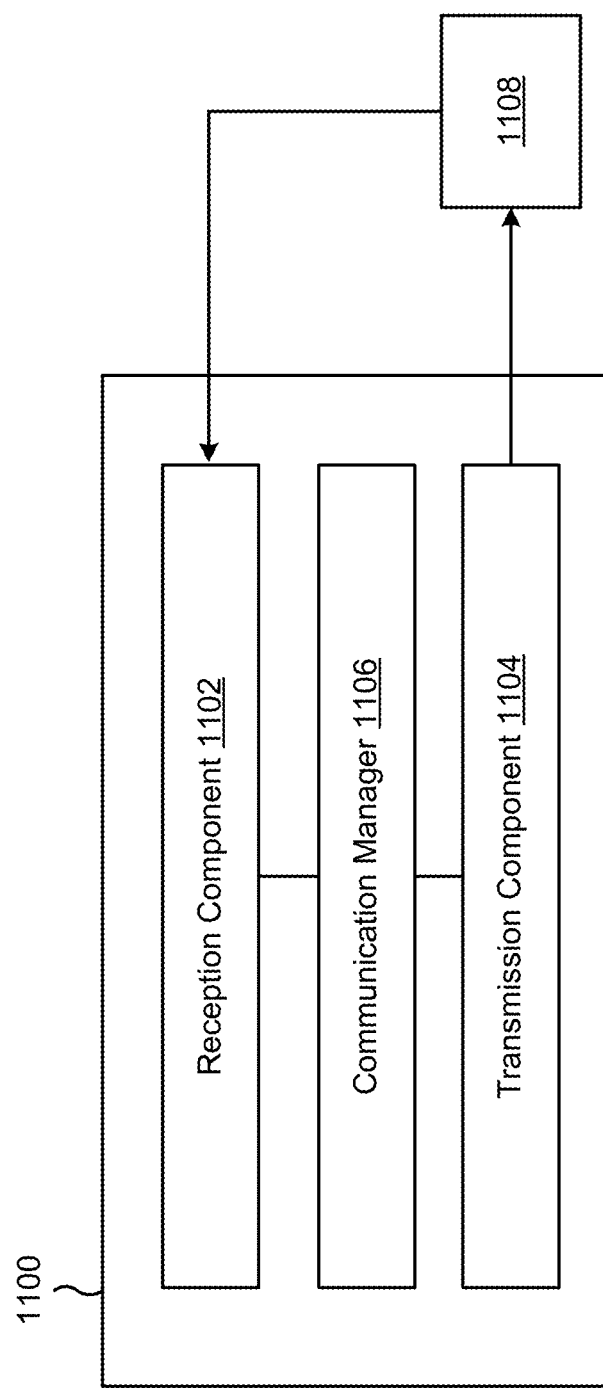
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 4-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The transmission component 1104 may transmit a measurement report indicating a plurality of candidate beam pairs for MIMO communication with a network node, wherein the plurality of candidate beam pairs includes a first beam pair and a second beam pair, wherein each beam of the plurality of candidate beam pairs has a spatial characteristic and a polarization characteristic. The reception component 1102 may receive a MIMO configuration for the first beam pair and the second beam pair, wherein a beam of the second beam pair is outside a beam avoidance region, wherein the beam avoidance region is defined based at least in part on the spatial characteristic of a beam of the first beam pair.

The communication manager 1106 may perform a beam selection process to identify a signal quality of each of the plurality of candidate beam pairs.

The communication manager 1106 may generate the measurement report to include the signal quality of each of the plurality of candidate beam pairs.

The communication manager 1106 may select one or more of the first beam pair or the second beam pair based at least in part on the minimum beam angle separation.

The transmission component 1104 may transmit a recommended minimum beam angle separation between the spatial characteristic of the beam of the first beam pair and the spatial characteristic of the beam of the second beam pair.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
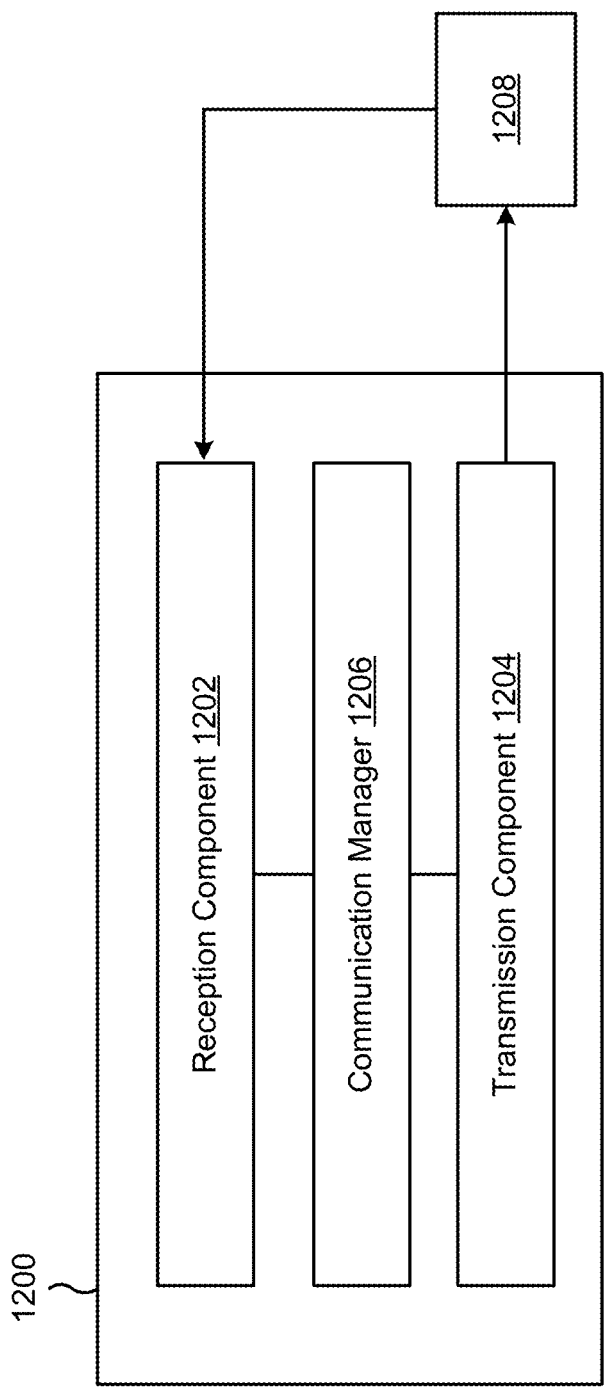
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 4-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The reception component 1202 may receive a measurement report indicating a plurality of candidate beam pairs for MIMO communication with a UE, wherein the plurality of candidate beam pairs includes a first beam pair and a second beam pair, wherein each beam of the plurality of candidate beam pairs has a spatial characteristic and a polarization characteristic. The transmission component 1204 may transmit a MIMO configuration for the first beam pair and the second beam pair, wherein a beam of the second beam pair is outside a beam avoidance region, wherein the beam avoidance region is defined based at least in part on the spatial characteristic of a beam of the first beam pair.

The communication manager 1206 may determine a signal quality of each of the plurality of candidate beam pairs based at least in part on the measurement report.

The communication manager 1206 may omit a third beam pair, of the plurality of candidate beam pairs, from the MIMO configuration, wherein the signal quality of the third beam pair is greater than the signal quality of the second beam pair, and wherein one or more beams of the third beam pair have the spatial characteristic within the beam avoidance region.

The communication manager 1206 may select one or more of the first beam pair or the second beam pair based at least in part on the minimum beam angle separation.

The reception component 1202 may receive a recommended minimum beam angle separation between the spatial characteristic of the beam of the first beam pair and the spatial characteristic of the beam of the second beam pair.

The communication manager 1206 may configure the first beam pair and the second beam pair according to the recommended minimum beam angle separation.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: transmitting a measurement report indicating a plurality of candidate beam pairs for MIMO communication with a network node, wherein the plurality of candidate beam pairs includes a first beam pair and a second beam pair, wherein each beam of the plurality of candidate beam pairs has a spatial characteristic and a polarization characteristic; and receiving a MIMO configuration for the first beam pair and the second beam pair, wherein a beam of the second beam pair is outside a beam avoidance region, wherein the beam avoidance region is defined, at least in part, on the spatial characteristic of a beam of the first beam pair.

Aspect 2: The method of Aspect 1, further comprising performing a beam selection process to identify a signal quality of each of the plurality of candidate beam pairs.

Aspect 3: The method of Aspect 2, further comprising generating the measurement report to include the signal quality of each of the plurality of candidate beam pairs.

Aspect 4: The method of Aspect 2, wherein the signal quality of the first beam pair is greater than the signal quality of the second beam pair.

Aspect 5: The method of Aspect 4, wherein the plurality of candidate beam pairs includes a third beam pair omitted from the MIMO configuration, wherein the signal quality of the third beam pair is greater than the signal quality of the second beam pair, and wherein one or more beams of the third beam pair have the spatial characteristic within the beam avoidance region.

Aspect 6: The method of any of Aspects 1-5, wherein the beam avoidance region is defined by an angle separation relative to the beam of the first beam pair.

Aspect 7: The method of Aspect 6, wherein the angle separation is based at least in part on an antenna array size used at the network node.

Aspect 8: The method of Aspect 6, wherein the angle separation is based at least in part on an antenna array size used at the UE.

Aspect 9: The method of any of Aspects 1-8, wherein the first beam pair and the second beam pair are configured according to a minimum beam angle separation between the spatial characteristic of the beam of the first beam pair and the spatial characteristic of the beam of the second beam pair.

Aspect 10: The method of Aspect 9, further comprising selecting one or more of the first beam pair or the second beam pair based at least in part on the minimum beam angle separation.

Aspect 11: The method of any of Aspects 1-10, further comprising transmitting a recommended minimum beam angle separation between the spatial characteristic of the beam of the first beam pair and the spatial characteristic of the beam of the second beam pair.

Aspect 12: The method of Aspect 11, wherein the first beam pair and the second beam pair are configured based at least in part on the recommended minimum beam angle separation.

Aspect 13: The method of any of Aspects 1-12, wherein the beam avoidance region is based, at least in part, on a boresight direction of one or more panels of the network node.

Aspect 14: The method of Aspect 14, wherein the beam avoidance region includes beams from multiple panels of the network node oriented with the same boresight direction.

Aspect 15: A method of wireless communication performed by a network node, comprising: receiving a measurement report indicating a plurality of candidate beam pairs for MIMO communication with a UE, wherein the plurality of candidate beam pairs includes a first beam pair and a second beam pair, wherein each beam of the plurality of candidate beam pairs has a spatial characteristic and a polarization characteristic; and transmitting a MIMO configuration for the first beam pair and the second beam pair, wherein a beam of the second beam pair is outside a beam avoidance region, wherein the beam avoidance region is defined, at least in part, on the spatial characteristic of a beam of the first beam pair.

Aspect 16: The method of Aspect 15, further comprising determining a signal quality of each of the plurality of candidate beam pairs based at least in part on the measurement report.

Aspect 17: The method of Aspect 16, wherein the signal quality of the first beam pair is greater than the signal quality of the second beam pair.

Aspect 18: The method of Aspect 17, further comprising omitting a third beam pair, of the plurality of candidate beam pairs, from the MIMO configuration, wherein the signal quality of the third beam pair is greater than the signal quality of the second beam pair, and wherein one or more beams of the third beam pair have the spatial characteristic within the beam avoidance region.

Aspect 19: The method of any of Aspects 15-18, wherein the beam avoidance region is defined by an angle separation relative to the beam of the first beam pair.

Aspect 20: The method of Aspect 19, wherein the angle separation is based at least in part on an antenna array size used at the network node.

Aspect 21: The method of Aspect 19, wherein the angle separation is based at least in part on an antenna array size used at the UE.

Aspect 22: The method of any of Aspects 15-21, wherein the first beam pair and the second beam pair are configured according to a minimum beam angle separation between the spatial characteristic of the beam of the first beam pair and the spatial characteristic of the beam of the second beam pair.

Aspect 23: The method of Aspect 22, further comprising selecting one or more of the first beam pair or the second beam pair based at least in part on the minimum beam angle separation.

Aspect 24: The method of any of Aspects 15-23, further comprising receiving a recommended minimum beam angle separation between the spatial characteristic of the beam of the first beam pair and the spatial characteristic of the beam of the second beam pair.

Aspect 25: The method of Aspect 24, further comprising configuring the first beam pair and the second beam pair according to the recommended minimum beam angle separation.

Aspect 26: The method of any of Aspects 15-25, wherein the beam avoidance region is based, at least in part, on a boresight direction of one or more panels of the network node.

Aspect 27: The method of Aspect 26, wherein the beam avoidance region includes beams from multiple panels of the network node, wherein the multiple panels are oriented with the same boresight direction.

Aspect 28: An apparatus for wireless communication at a device, comprising a processor; memory coupled with the processor; and instructions stored in the memory and executable by the processor to cause the apparatus to perform the method of one or more of Aspects 1-27.

Aspect 29: A device for wireless communication, comprising a memory and one or more processors coupled to the memory, the one or more processors configured to perform the method of one or more of Aspects 1-27.

Aspect 30: An apparatus for wireless communication, comprising at least one means for performing the method of one or more of Aspects 1-27.

Aspect 31: A non-transitory computer-readable medium storing code for wireless communication, the code comprising instructions executable by a processor to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a +b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   generate a measurement report indicating a plurality of candidate beam pairs for multiple-input multiple-output (MIMO) communication with a network node, wherein the plurality of candidate beam pairs includes a first beam pair and a second beam pair, wherein each beam of the plurality of candidate beam pairs has a spatial characteristic indicating a direction of the beam and a polarization characteristic indicating a polarization of the beam;
   transmit the generated measurement report; and receive a MIMO configuration for the first beam pair and the second beam pair, wherein a beam of the second beam pair is outside a beam avoidance region, wherein the beam avoidance region is defined based at least in part on the spatial characteristic of a beam of the first beam pair, wherein the beam is within the beam avoidance region.

2. The UE of claim 1, wherein the one or more processors are further configured to perform a beam selection process to identify a signal quality of each of the plurality of candidate beam pairs.

3. The UE of claim 2, wherein the one or more processors are further configured to generate the measurement report to include the signal quality of each of the plurality of candidate beam pairs.

4. The UE of claim 2, wherein the signal quality of the first beam pair is greater than the signal quality of the second beam pair.

5. The UE of claim 4, wherein the plurality of candidate beam pairs includes a third beam pair omitted from the MIMO configuration, wherein the signal quality of the third beam pair is greater than the signal quality of the second beam pair, and wherein one or more beams of the third beam pair have the spatial characteristic within the beam avoidance region.

6. The UE of claim 1, wherein the beam avoidance region is defined by an angle separation relative to the beam of the first beam pair.

7. The UE of claim 6, wherein the angle separation is based at least in part on an antenna array size used at the network node.

8. The UE of claim 6, wherein the angle separation is based at least in part on an antenna array size used at the UE.

9. The UE of claim 1, wherein the first beam pair and the second beam pair are configured according to a minimum beam angle separation between the spatial characteristic of the beam of the first beam pair and the spatial characteristic of the beam of the second beam pair.

10. The UE of claim 9, wherein the one or more processors are further configured to select one or more of the first beam pair or the second beam pair based at least in part on the minimum beam angle separation.

11. The UE of claim 1, wherein the one or more processors are further configured to transmit a recommended minimum beam angle separation between the spatial characteristic of the beam of the first beam pair and the spatial characteristic of the beam of the second beam pair.

12. The UE of claim 11, wherein the first beam pair and the second beam pair are configured based at least in part on the recommended minimum beam angle separation.

13. The UE of claim 1, wherein the beam avoidance region is based at least in part on a boresight direction of one or more panels of the network node.

14. The UE of claim 13, wherein the beam avoidance region includes beams from multiple panels of the network node oriented with a same boresight direction.

15. A network node for wireless communication, comprising:
a memory; and
one or more processors, coupled to the memory, configured to:
receive a measurement report indicating a plurality of candidate beam pairs for multiple-input multiple-output (MIMO) communication with a user equipment (UE), wherein the plurality of candidate beam pairs includes a first beam pair and a second beam pair, wherein each beam of the plurality of candidate beam pairs has a spatial characteristic indicating a direction of the beam and a polarization characteristic indicating a polarization of the beam; and
transmit a MIMO configuration for the first beam pair and the second beam pair, wherein a beam of the second beam pair is outside a beam avoidance region, wherein the beam avoidance region is defined based at least in part on the spatial characteristic of a beam of the first beam pair, wherein the beam is within the beam avoidance region.

16. The network node of claim 15, wherein the one or more processors are further configured to determine a signal quality of each of the plurality of candidate beam pairs based at least in part on the measurement report.

17. The network node of claim 16, wherein the signal quality of the first beam pair is greater than the signal quality of the second beam pair.

18. The network node of claim 17, wherein the one or more processors are further configured to omit a third beam pair, of the plurality of candidate beam pairs, from the MIMO configuration, wherein the signal quality of the third beam pair is greater than the signal quality of the second beam pair, and wherein one or more beams of the third beam pair have the spatial characteristic within the beam avoidance region.

19. The network node of claim 15, wherein the beam avoidance region is defined by an angle separation relative to the beam of the first beam pair.

20. The network node of claim 19, wherein the angle separation is based at least in part on an antenna array size used at the network node.

21. The network node of claim 19, wherein the angle separation is based at least in part on an antenna array size used at the UE.

22. The network node of claim 15, wherein the first beam pair and the second beam pair are configured according to a minimum beam angle separation between the spatial characteristic of the beam of the first beam pair and the spatial characteristic of the beam of the second beam pair.

23. The network node of claim 22, wherein the one or more processors are further configured to select one or more of the first beam pair or the second beam pair based at least in part on the minimum beam angle separation.

24. The network node of claim 15, wherein the one or more processors are further configured to receive a recommended minimum beam angle separation between the spatial characteristic of the beam of the first beam pair and the spatial characteristic of the beam of the second beam pair.

25. The network node of claim 24, wherein the one or more processors are further configured to configure the first beam pair and the second beam pair according to the recommended minimum beam angle separation.

26. The network node of claim 15, wherein the beam avoidance region is based at least in part on a boresight direction of one or more panels of the network node.

27. The network node of claim 26, wherein the beam avoidance region includes beams from multiple panels of the network node, wherein the multiple panels are oriented with a same boresight direction.

28. A method of wireless communication performed by a user equipment (UE), comprising:
generating a measurement report indicating a plurality of candidate beam pairs for multiple-input multiple-output (MIMO) communication with a network node, wherein the plurality of candidate beam pairs includes a first beam pair and a second beam pair, wherein each beam of the plurality of candidate beam pairs has a spatial characteristic indicating a direction of the beam and a polarization characteristic indicating a polarization of the beam;

transmitting the generated measurement report; and receiving a MIMO configuration for the first beam pair and the second beam pair, wherein a beam of the second beam pair is outside a beam avoidance region, wherein the beam avoidance region is defined based at least in part on the spatial characteristic of a beam of the first beam pair, wherein the beam is within the beam avoidance region.

29. A method of wireless communication performed by a network node, comprising:

receiving a measurement report indicating a plurality of candidate beam pairs for multiple-input multiple-output (MIMO) communication with a user equipment (UE), wherein the plurality of candidate beam pairs includes a first beam pair and a second beam pair, wherein each beam of the plurality of candidate beam pairs has a spatial characteristic indicating a direction of the beam and a polarization characteristic indicating a polarization of the beam; and transmitting a MIMO configuration for the first beam pair and the second beam pair, wherein a beam of the second beam pair is outside a beam avoidance region, wherein the beam avoidance region is defined based at least in part on the spatial characteristic of a beam of the first beam pair, wherein the beam is within the beam avoidance region.

* * * * *